US008112764B2

(12) United States Patent
Conroy et al.

(10) Patent No.: US 8,112,764 B2
(45) Date of Patent: Feb. 7, 2012

(54) DEVICES AS SERVICES IN A DECENTRALIZED OPERATING SYSTEM

(75) Inventors: David G. Conroy, El Granada, CA (US); Georgios Chrysanthakopoulos, Redmond, WA (US); Henrik F. Nielsen, Huntspoint, WA (US)

(73) Assignee: Microsoft Corporation, Redmond, WA (US)

( * ) Notice: Subject to any disclaimer, the term of this patent is extended or adjusted under 35 U.S.C. 154(b) by 1796 days.

(21) Appl. No.: 10/717,830

(22) Filed: Nov. 20, 2003

(65) Prior Publication Data

US 2005/0114868 A1    May 26, 2005

(51) Int. Cl.
G06F 9/44    (2006.01)
G06F 13/00    (2006.01)
(52) U.S. Cl. ......... 719/316; 719/313; 719/315; 719/330
(58) Field of Classification Search .................. 719/315, 719/318, 330
See application file for complete search history.

(56) References Cited

U.S. PATENT DOCUMENTS

| | | | |
|---|---|---|---|
| 6,643,650 B1 * | 11/2003 | Slaughter et al. ............... | 707/10 |
| 6,895,588 B1 * | 5/2005 | Ruberg ........................... | 719/321 |
| 7,269,664 B2 * | 9/2007 | Hutsch et al. ................... | 709/246 |
| 2002/0029256 A1 * | 3/2002 | Zintel et al. .................... | 709/218 |
| 2003/0074215 A1 * | 4/2003 | Morciniec et al. ................ | 705/1 |
| 2003/0101294 A1 * | 5/2003 | Saint-Hilaire et al. .......... | 710/11 |
| 2004/0181796 A1 * | 9/2004 | Fedotov et al. ................ | 719/323 |

FOREIGN PATENT DOCUMENTS

| | | | |
|---|---|---|---|
| JP | 2002288110 A | 10/2002 |
| JP | 2003001878 A | 1/2003 |
| JP | 2003178017 A | 6/2003 |
| WO | WO 01/86428 A2 | 11/2001 |

OTHER PUBLICATIONS

"Jini(TM) Device Architecture Specification," Sun Microsystems, Inc., Palo Alto, California, Jan. 25, 1999.
McKee, P., and I. Marshall, "Behavioural Specification Using XML," Proceedings of the Seventh IEEE Workshop on Future Trends of Distributed Computing Systems, Cape Town, South Africa, Dec. 20-22, 1999, pp. 53-59.
Moller, M.B., and B.N. Jorgensen, "Enhancing Jini's Lookup Service Using XML-based Service Templates," Proceedings of the Technology of Object-Oriented Languages and Systems, TOOLS 38, IEEE Computer Society, Zurich, Switzerland, Mar. 12-14, 2001, pp. 19-31.

* cited by examiner

*Primary Examiner* — S Sough
*Assistant Examiner* — Kimberly Jordan
(74) *Attorney, Agent, or Firm* — Lee & Hayes, PLLC

(57) ABSTRACT

Various embodiments of the present invention transform devices into Web services or special-purpose servers that are capable of communicating with personal computers. Various embodiments of the present invention allow various low-level aspects of device drivers to reside in the devices, eliminating the need for the devices to be compatible with legacy specification. Various embodiments of the present invention allow various devices to be shipped from the factory with low-level software already built in so that users are liberated from having to deal with the experience of installing and upgrading device drivers. In various embodiments of the present invention, each device is preferably a network node identifiable by a Uniform Resource Identifier (URI).

21 Claims, 15 Drawing Sheets

```
UNILATERALCONTRACT PDA {   210A-3

// AVAILABLE MESSAGES
OPEN(FILENAME);            210A-4
PLAY(PORT);                210A-5
RECORD(DATA);              210A-6
CLOSE(FILENAME);           210A-7

// BEHAVIORS
B = OPEN.BPR;              210A-8
BPR = PLAY.BPR + RECORD.BPR + CLOSE;
}                          210A-9
```

```
UNILATERALCONTRACT SPEAKER {   210B-3

// AVAILABLE MESSAGES
OPEN(FILENAME);                210B-4
REPRODUCE(PORT);               210B-5
CLOSE(FILENAME);               210B-6

// BEHAVIORS
B = OPEN.BP;                   210B-7
BP = REPRODUCE.BP + CLO        210B-8
}
```

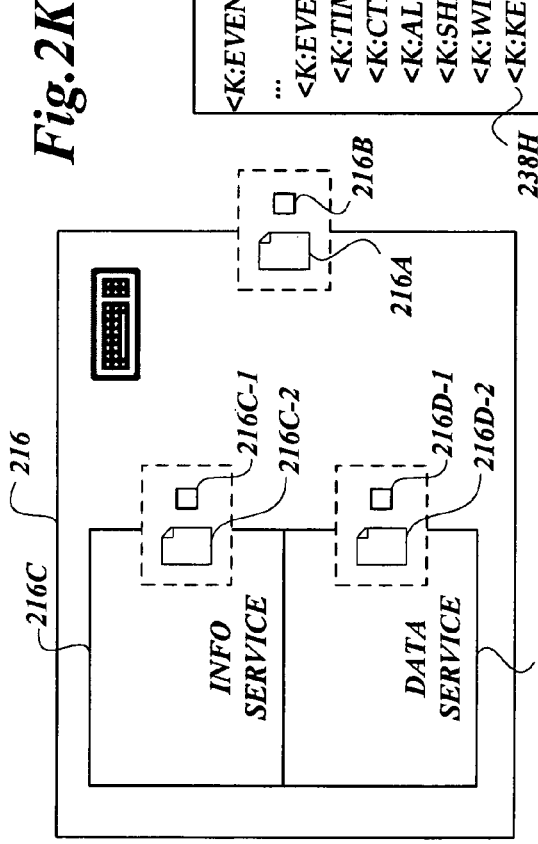

```
<D:INFO XMLNS:D="HTTP://SCHEMAS.COM/D/I">   244A
  <D:W>123</D:W>      244B
  <D:H>123</D:H>      244C
  <D:FORMAT>RGB32</D:FORMAT>    244D
</D:INFO>     244E
```

Fig. 2P.

```
<D:SHAPE XMLNS:D="HTTP://SCHEMAS.COM/C/S">    246A
  <D:IMAGE> ... </D:IMAGE>      246B
  <D:MASK> ... </D:MASK>        246C
  <D:HOTSPOT>                   246D
    <D:DH>-3</D:DH>             246E
    <D:DV>-5</D:DV>             246F
  </D:HOTSPOT>                  246G
</D:SHAPE>     246H
```

Fig. 2Q.

```
<D:POSITION XMLNS:D="HTTP://SCHEMAS.COM/C/P">   248A
  <D:H>123</D:H>     248B
  <D:V>123</D:V>     248C
</D:POSITION>        248D
```

Fig. 2R.

```
<D:WINDOW XMLNS:D="HTTP://SCHEMAS.COM/D/W">   250A
  <D:URI> ... </D:URI>      250B
  <D:T>123</D:T>     250C
  <D:L>123</D:L>     250D
  <D:W>123</D:W>     250E
  <D:H>123</D:H>     250F
  <D:DROPTIME>123</D:DROPTIME>    250G
</D:WINDOW>     250H
```

Fig. 2S.

DEVICES AS SERVICES IN A DECENTRALIZED OPERATING SYSTEM

FIELD OF THE INVENTION

The present invention relates to devices as subsystems of computing systems, and more particularly, to a basic design structure in which devices are represented as services in a decentralized operating system.

BACKGROUND OF THE INVENTION

What's bright blue that strikes terror into the heart of a personal computer user? It is the dreaded blue screen, which is caused almost always by programming errors. Device drivers are a common source of these errors. A device driver is a software component that permits a computer system to communicate with a device. If a correct driver is not installed in a system, a device cannot be used, because, in most cases, the driver is the only piece of software that understands how to manipulate the hardware used to communicate with the device. Given the proliferation of devices and device drivers, programming errors have exploded exponentially. It is virtually impossible for a programmer to visualize all the interactions between devices and computers or to determine the results of interactions with every other device to which a computer may be interconnected. FIG. 1 shows a system 100 that illustrates these problems and other problems in greater detail.

FIG. 1 illustrates a centralized operating system: Linux operating system 101. The Linux operating system 101 controls and coordinates the use of hardware, such as input/output devices 114, among applications 106 for various users. The Linux operating system 101 centralizes control and coordination by employing three tightly coupled portions of code similar to other UNIX operating system variants: a kernel 102, system libraries 104, and system utilities (daemons) 108. The kernel 102 forms the core of the Linux operating system 101. The kernel 102 provides all the functionality necessary to run processes, and it provides protected access to hardware resources, such as input/output devices 114. System libraries 104 specify a standard set of functions and application programming interfaces through which applications can interact with the kernel 102, and which implement much of the Linux operating system 101. A point of departure from the UNIX operating system variants lies in the operating system interface of the Linux operating system 101, which is not directly maintained by the kernel 102. Rather, the applications 106 make calls to the system libraries 104, which in turn call the operating system functions of the kernel 102 as necessary. System utilities (daemons) 108 are programs that perform individual, specialized management tasks, such as responding to incoming network connections, housekeeping, or maintenance utilities without being called by the user. The kernel 102 is created as a single, monolithic architecture (revealing the UNIX pedigree of the Linux operating system 101). The main reason for the single binary is to improve the overall performance of the Linux operating system 101 by concentrating power, authority, control, and coordination of resources. Everything is tightly coupled in the kernel 102, such as kernel code and data structures. Everything is kept in a single address space, and thus, no expensive context switches are necessary when a process calls an operating system function or when a hardware interrupt is delivered. Not only does the core scheduling and virtual memory code occupy this address space, but all kernel code, including all device drivers 110, file systems, and networking code, is presented in the same single address space.

One problem with such a tightly coupled design is that it is vulnerable. By exposing device drivers 110 in the single address space, these device drivers can act as Trojan horses for housing unreliable code that can deadlock the Linux operating system 101. In almost all cases, the only way for applications 106 to communicate with the input/output devices 114 is by means of device drivers 110 in kernel mode. Kernel mode is the most privileged execution mode of the Linux operating system 101. Privileged means that there is no way for the Linux operating system 101 to monitor the running code of the device drivers 110 or to protect memory from being accessed. Thus, errant kernel-mode device drivers 110 can do whatever they want with no oversight by the Linux operating system 101. One example is the issue of handling hardware-interrupt generation. Due to the asynchronous nature of hardware interrupts, just one programming error in the interrupt handler may deadlock the system or corrupt data in a pathologic, rarely reproducible manner.

Devices of yesteryear seemed stable because their numbers were few and their interconnections to computers were simple. Devices nowadays have proliferated to the benefit of users but such proliferation is attended by a marked increase in the number of device drivers necessary to provide links between applications 106 and input/output devices 114. Without a solution to increase reliability of errant device drivers, users may eventually no longer trust the system 100 to provide a desired computing experience, causing demand for the system 100 to diminish from the marketplace. Thus, there is a need for a method and a system for representing devices as services while avoiding or reducing the foregoing and other problems associated with existing systems.

SUMMARY OF THE INVENTION

In accordance with this invention, a system, method, and computer-readable medium for representing devices as services is provided. The system form of the invention includes, in a networked system, a device that is a computer subsystem. The device comprises one or more services executing in the device. Each service includes a port identifiable by an identifier that includes a uniform resource identifier and a contract for describing one or more behaviors of the service.

Another system form of the invention includes, in a networked computer system, a terminal service. The terminal service comprises a display service with a port identifiable by an identifier that includes a uniform resource identifier and a contract for describing one or more behaviors of the display service. The terminal service further comprises a keyboard service with a port identifiable by an identifier that includes a uniform resource identifier and a contract for describing one or more behaviors of the keyboard service. The terminal service further comprises a mouse service with a port identifiable by an identifier that includes a uniform resource identifier and a contract for describing one or more behaviors of the mouse service.

A method form of the invention includes a computer-implemented method for processing input/output events by devices as services. The method comprises requesting a service representing a device for an input/output event. The service includes a port identifiable by an identifier that includes at a uniform resource identifier and a contract for describing one or more behaviors of the service. The method further comprises receiving a customizable, tag-based message that contains the input/output event. The method yet further comprises requesting the service to remove the input/output event.

A computer-readable form of the invention includes a computer-readable medium having computer-executable instructions for implementing a computer-implemented method for processing input/output events by devices as services. The method comprises requesting a service representing a device for an input/output event. The service includes a port identifiable by an identifier that includes a uniform resource identifier and a contract for describing one or more behaviors of the service. The method further comprises receiving a customizable, tag-based message that contains the input/output event. The method yet further comprises requesting the service to remove the input/output event.

Another system form of the invention includes, in a networked system, a device that is a computer subsystem. The device comprises one or more services executing in the device. Each service includes a port identifiable by an identifer that includes a uniform resource identifier. The device is capable of coupling to the networked system to exchange customizable, tag-based messages.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2K is a block diagram illustrating an exemplary keyboard service; FIGS. 2L-2M are structured diagrams illustrating customizable, tag-based documents relating to the keyboard service illustrated in FIG. 2K;

FIGS. 2P-2T are structured diagrams illustrating customizable, tag-based documents relating to the exemplary display service illustrated in FIG. 2O;

DETAILED DESCRIPTION OF THE PREFERRED EMBODIMENT

Various embodiments of the present invention transform devices into Web services or special-purpose servers that are capable of communicating with other devices, such as personal computers. Various embodiments of the present invention allow various low-level aspects of device drivers to reside in the devices, hence eliminating the need for the devices to be compatible with legacy specification. Various embodiments of the present invention allow various devices to be shipped from the factory with low-level software already built in so that users are liberated from having to deal with the experience of installing and upgrading device drivers. In various embodiments of the present invention, each device is preferably a network node identifiable by a Uniform Resource Identifier (URI). The term "service" as used hereinbelow and hereinbefore means the inclusion of loosely coupled services.

Figure 1:
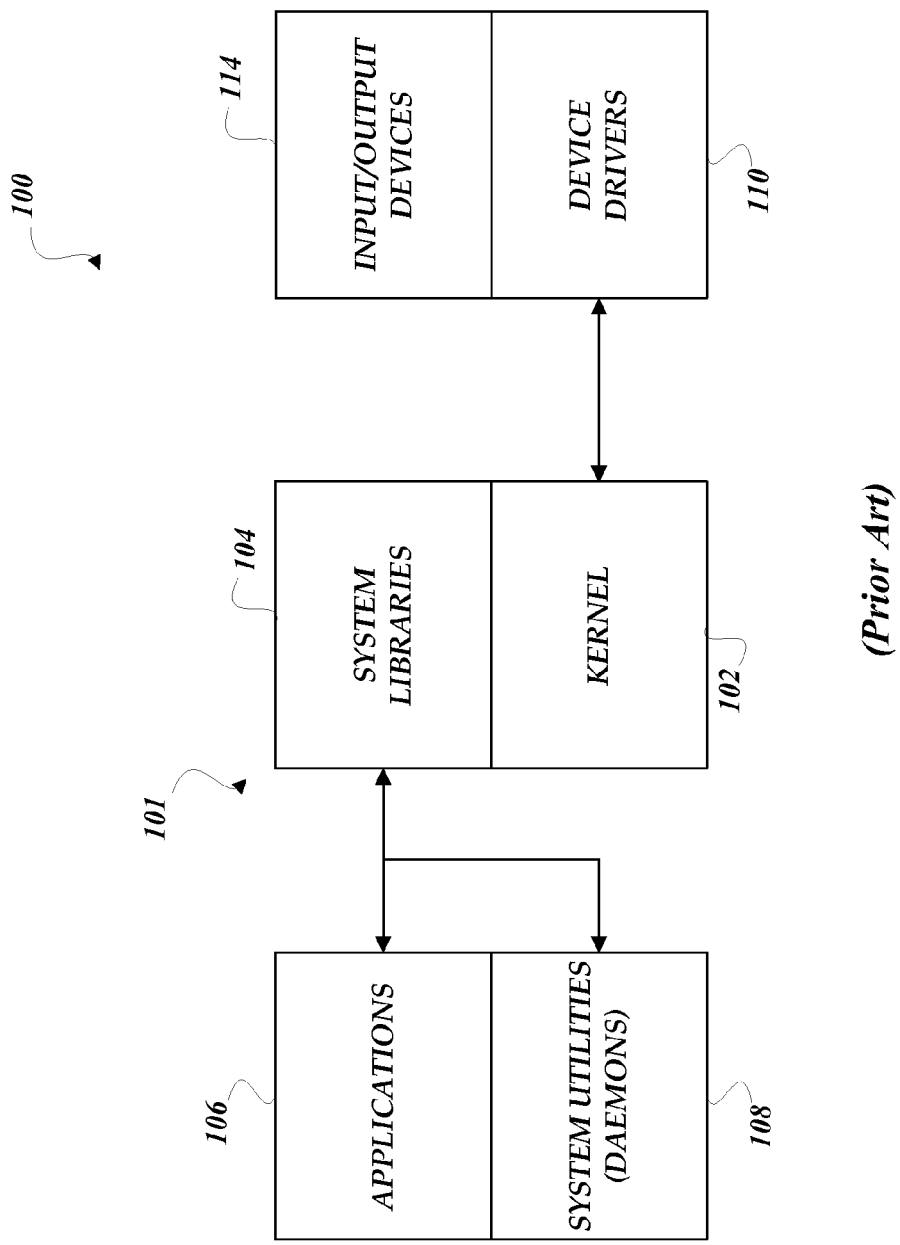
FIG. 1 is a block diagram illustrating a conventional computing system and the relationship between input/output devices, device drivers, and an operating system.
Figures 2A, 2B, 2C:
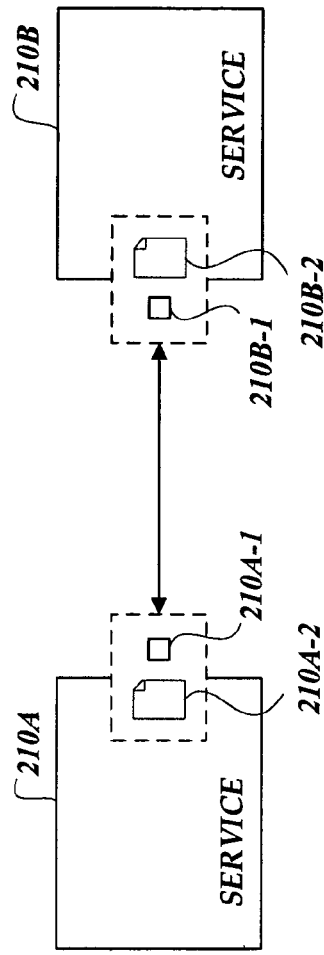
FIG. 2A is a block diagram illustrating exemplary services.
FIGS. 2B-2C are structured diagrams illustrating exemplary unilateral contracts for services illustrated in FIG. 2A.

FIG. 2A illustrates two operating system services 210A, 210B, each with a port identifiable by URI 210A-1, 210B-1, which constitutes a unique designation of an operating system service or another service, and a unilateral contract 210A-2, 210B-2. Devices can be represented as services, such as services 210A, 210B. Ports of services are endued with behavioral types, which are specified by the unilateral contracts. The preferred communication mechanism of devices is through programmatically wired ports. Wired ports are possible if the behavioral type of one port is compatible with the behavioral type of another port. When ports are programmatically wired to each other (identifiable by URIs 210A-1, 210B1), services 210A, 210B communicate by sending messages to each other. Simply put, unilateral contracts 210A-2, 210B-2 are expressed in a language specifying an order of messages which flow in or out of services 210A, 210B.

Sharing resources is possible through interaction in a way compatible with the behaviors of the resources. Behaviors of resources (represented by services) are expressed in unilateral contracts. A service can be regulated by a unilateral contract. Thus, one can attach behavioral conditions to files via unilateral contracts to govern access control. A portion of the unilateral contract 210A-2 is illustrated in FIG. 2B. Line 210A-3 contains the key word UNILATERALCONTRACT followed by the designator "PDA," and a pair of open and closed curly brackets "{ }" for delimiting the definition of the unilateral contract 210A-2. Line 210A-4 declares the signature of the OPEN operation that takes a file name "FILENAME" as a parameter. To use the operating system service 210A, external services specify a name of a file to be opened via the OPEN operation. Thus, the OPEN operation should be the first operation that is invoked by other services for each session. The PLAY operation is declared in line 210A-5. The PLAY operation takes another service's port as a parameter. When the PLAY operation is invoked by other services, the operating system service 210A reads a stream of data from an open file and transmits the read data toward the given service's port. Other services, such as the operating system service 210B, can also record information to opened files via the RECORD operation, which is declared on line 210A-6. The RECORD operation takes data as a parameter. This data is written by the RECORD operation to the opened file. When all desired operations have been carried out on the opened file, the opened file can be closed via the CLOSE operation, which is declared on line 210A-7. The CLOSE operation takes a file name "FILENAME" as an argument so that the CLOSE operation knows which file to close.

Lines 210A-8-210A-9 contain the behaviors of the operating system service 210A. Line 210A-8 contains a behavior sentence: B=OPEN.BPR, where B is a behavior rule; OPEN denotes that the OPEN operation is the first operation to be invoked in using the operating system service 210A; the period "." denotes that additional behaviors are to follow the invocation of the OPEN operation; and BPR refers to a second behavior sentence defined further on line 210A-9. Line 210A-9 contains the following behavioral sentence: BPR=PLAY.BPR+RECORD.BPR+CLOSE, where BPR denotes the second behavior; PLAY.BPR denotes the invocation of the PLAY operation, which is then followed by the second behavior again (a recursion); RECORD.BPR denotes the invocation of the RECORD operation, which is then followed, recursively, by the second behavior; CLOSE denotes the invocation of the CLOSE operation; and the plus signs "+" denote choices that other services, such as the operating system service 210B, can make to invoke among the PLAY operation, the RECORD operation, or the CLOSE operation.

A portion of the unilateral contract 210B-2 is illustrated in FIG. 2C. Line 210B-3 contains the keyword UNILATERAL-CONTRACT followed by the designator "SPEAKER," and a pair of open and closed curly brackets "{ }" for delimiting the definition of the portion of the unilateral contract 210B-2. Line 210B-4 declares the signature of the OPEN operation that takes a file name "FILENAME" as a parameter. The REPRODUCE operation is declared on line 210B-5. The REPRODUCE operation takes another service's port as a parameter. The CLOSE operation is declared on line 210B-6 and it takes a filename "FILENAME" as an argument so that the CLOSE operation knows which file to close.

Lines 210B-7-210B-8 contain the behaviors of the operating system service 210B.

Line 210B-7 contains a behavior sentence: B=OPEN.BP, where B is a behavior rule; OPEN denotes that the OPEN operation is the first operation to be invoked in a session with the operating system service 210B; the period "." denotes that the additional behaviors are to follow the invocation of the OPEN operation; and BP refers to a second behavior sentence defined further on line 210B-8. Line 210B-8 contains the following behavioral sentence: BP=REPRODUCE.BP+CLOSE, where BP denotes the second behavior; REPRODUCE.BP denotes the invocation of the REPRODUCE operation, which is then followed by the second behavior again (a recursion); CLOSE denotes the invocation of the CLOSE operation; and the plus sign "+" denotes choices that an external service, such as the operating system service 210A, can make to invoke among the REPRODUCE operation and the CLOSE operation.

The unilateral contract 210A-2, when accepted by the service 210B, and the unilateral contract 210B-2, when accepted by the service 210A, creates an instance of communication between the service 210A and the service 210B. Each unilateral contract 210A-2, 210B-2 can be accepted by the services 210A, 210B by a mere promise to perform, but preferably is accepted by the performance of unilateral contracts 210A-2, 210B-2 in accordance with the behaviors expressed in those unilateral contracts. Thus, if the service 210B complies with and performs the behaviors as expressed by behavior sentences 210A-8, 210A-9 of the unilateral contract 210A-2, the service 210B is bound to provide the promised services. For example, if the operating system service 210B has performed by first invoking the OPEN operation as specified by the behavioral sentence 210A-8 and then either invokes the PLAY operation or the RECORD operation or the CLOSE operation as specified by the behavioral sentence shown on line 210A-9, then the operating system service 210A complies with the requested invocations to provide the desired services, such as opening a file, playing the content of the file, recording content into a file, or closing the file.

Figure 2D:
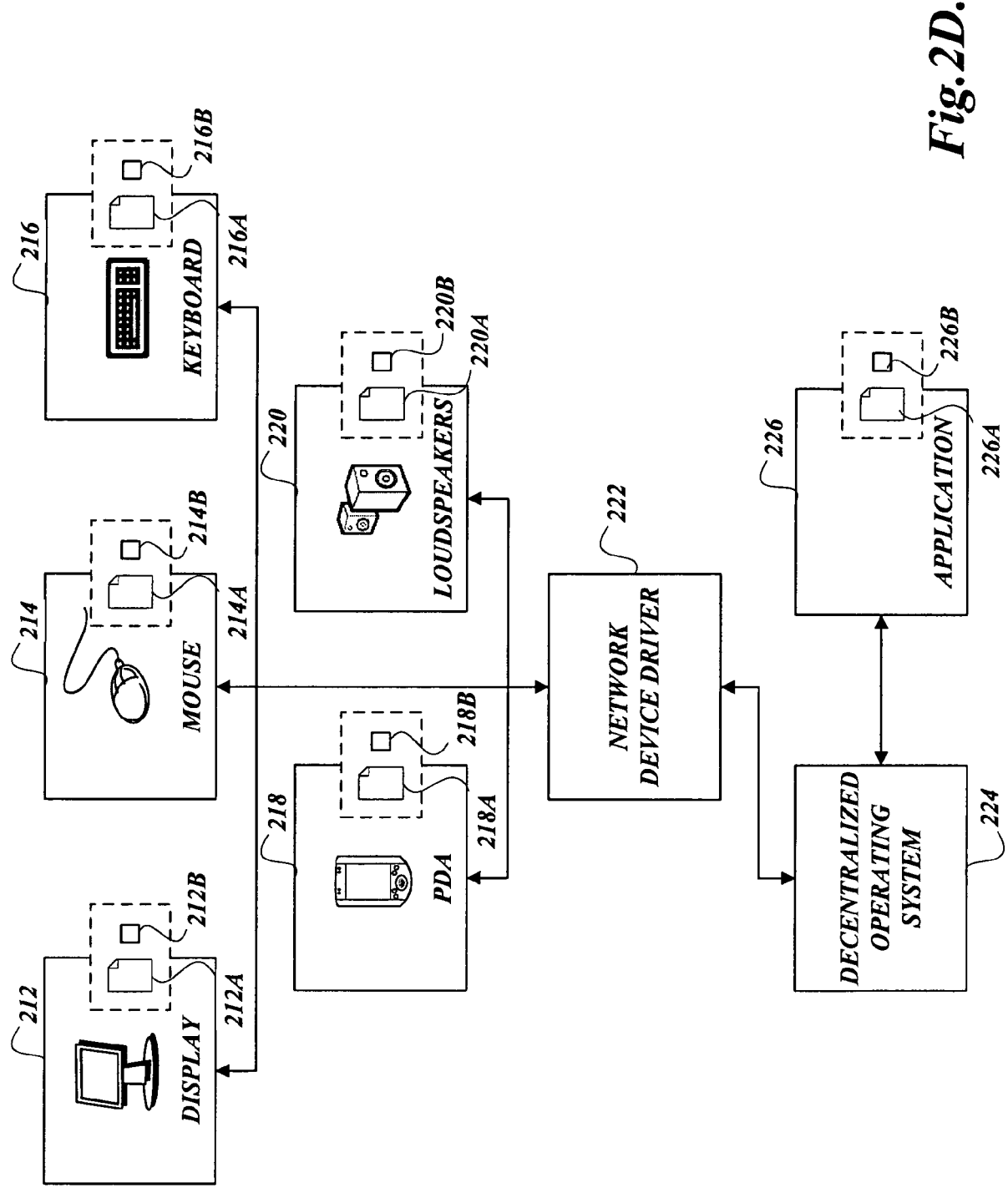
FIG. 2D is a block diagram illustrating devices as services in a decentralized operating system.

A number of devices as services 212-220, each with a port identifiable by an identifier (such as a URI) 212B-220B, and a unilateral contract 212A-220A, are illustrated at FIG. 2D. The display service 212 represents a display which is the visual output device of a computer, which is commonly a CRT-based video display, but increasingly is comprised of an LCD-based or gas plasma-based flat-panel display. The mouse service 214 represents a mechanical mouse, which is a common pointing device. The basic features of a mechanical mouse are a flat-bottom casing designed to be gripped by one hand; one or more buttons on the top; a multi-directional detection device (usually a ball and some shaft encoders) on the bottom; and a cable connecting the mouse to the computer. By moving the mouse on a surface (such as a desktop), the user typically controls an on-screen cursor. A mouse is a relative pointing device because there are no defined limits to the mouse's movement and because its placement on a surface does not map directly to a specific screen location. To select items or choose commands on the screen, the user presses one of the mouse's buttons, producing a "mouse click." The keyboard service 216 represents a keyboard, which is a hardware unit with a set of switches that resembles a typewriter keyboard and that conveys information from a user to a computer or data communication circuit. The PDA service 218 represents a personal digital assistant, which is a lightweight computer designed to provide specific functions like personal organization (calendar, note-taking, database, calculator, and so on) as well as communications. (One exemplary unilateral contract 218A for the PDA service 218 includes the unilateral contract 210A-2.) More advanced personal digital assistants also offer multimedia features, such as music playing. Many personal digital assistants rely on a pen or other pointing device for input instead of a keyboard or a mouse, although some offer a keyboard too small for touch typing to use in conjunction with a pen or pointing device. For data storage, a personal data assistant relies on flash memory instead of power-hungry disk drives. The loudspeakers service 220 represents loudspeakers, which are devices that accept customizable, tagged-based messages containing a digital encoding of sound, which transform the contents of the messages into sounds loud enough to be heard by the user. (One exemplary unilateral contract 220A for the loudspeakers service 220 includes the unilateral contract 210B-2.)

Whereas, conventionally, each device—represented by the display service 212, the mouse service 214, the keyboard service 216, the PDA service 218, and the loudspeaker service 220—would require separate device drivers, various embodiments of the present invention dispense with a specific device driver for each device represented by one of the services 212-220. Only one network device driver 222 need be present for various services 212-220 to communicate with the decentralized operating system 224 and eventually with an application being represented by an application service 226 identifiable by an identifier (such as a URI) 226B and a unilateral contract 226A.

Figure 2E:
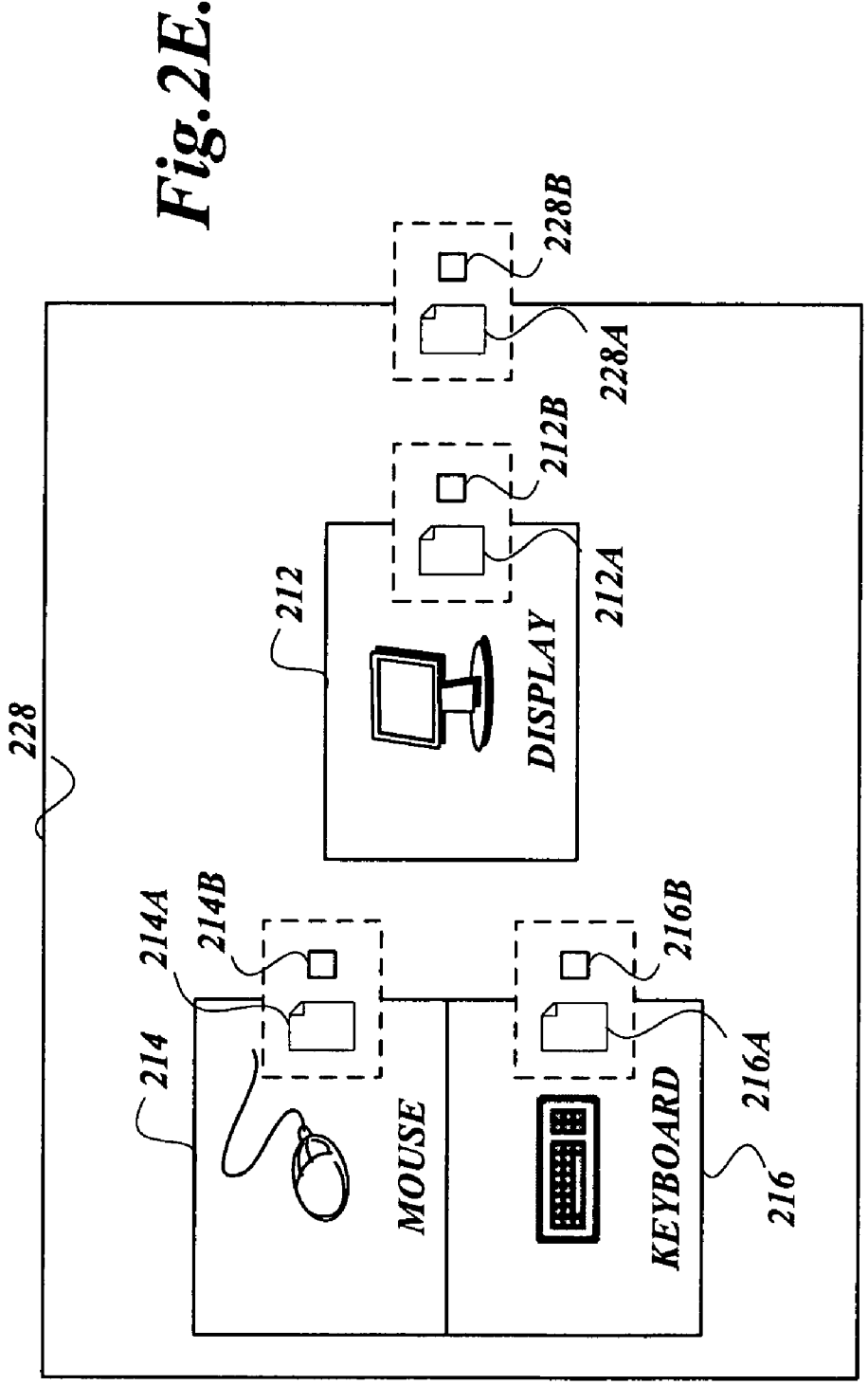
FIG. 2E is a block diagram illustrating an exemplary composed service for representing a terminal.

FIG. 2E illustrates a composed service 228 with a port identifiable by an identifier (such as a URI) 228B and a unilateral contract 228A. The composed service 228 is formed from a mouse service 214, a keyboard service 216, and a display service 212. Typically, the display, the mouse, and the keyboard operate as a group. The composed service 228 subscribes to changes in the keyboard service 216, consumes keyboard events as they are generated by the keyboard service 216, and generates corresponding keyboard events. The state of modifier keys in each keyboard event is noted so that the modifier keys can be attached to mouse events. The composed service 228 subscribes to changes in the mouse service 214, consumes mouse events as they are generated, converts relative mouse motion (for mouse events) into absolute mouse motion, updates the absolute position of the on-screen cursor, and generates corresponding absolute mouse events. The state of modifier keys in each keyboard event is noted so that the modifier keys can be attached to mouse events.

Figure 2T:
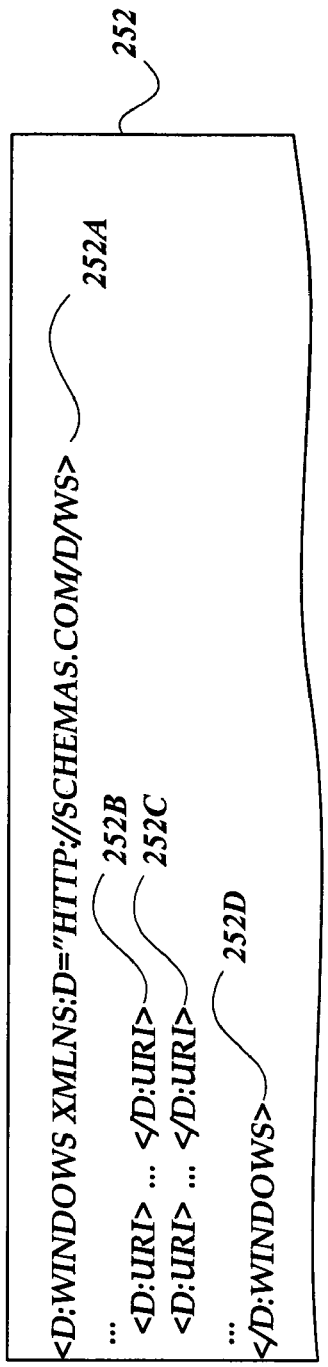
Figure 2F:
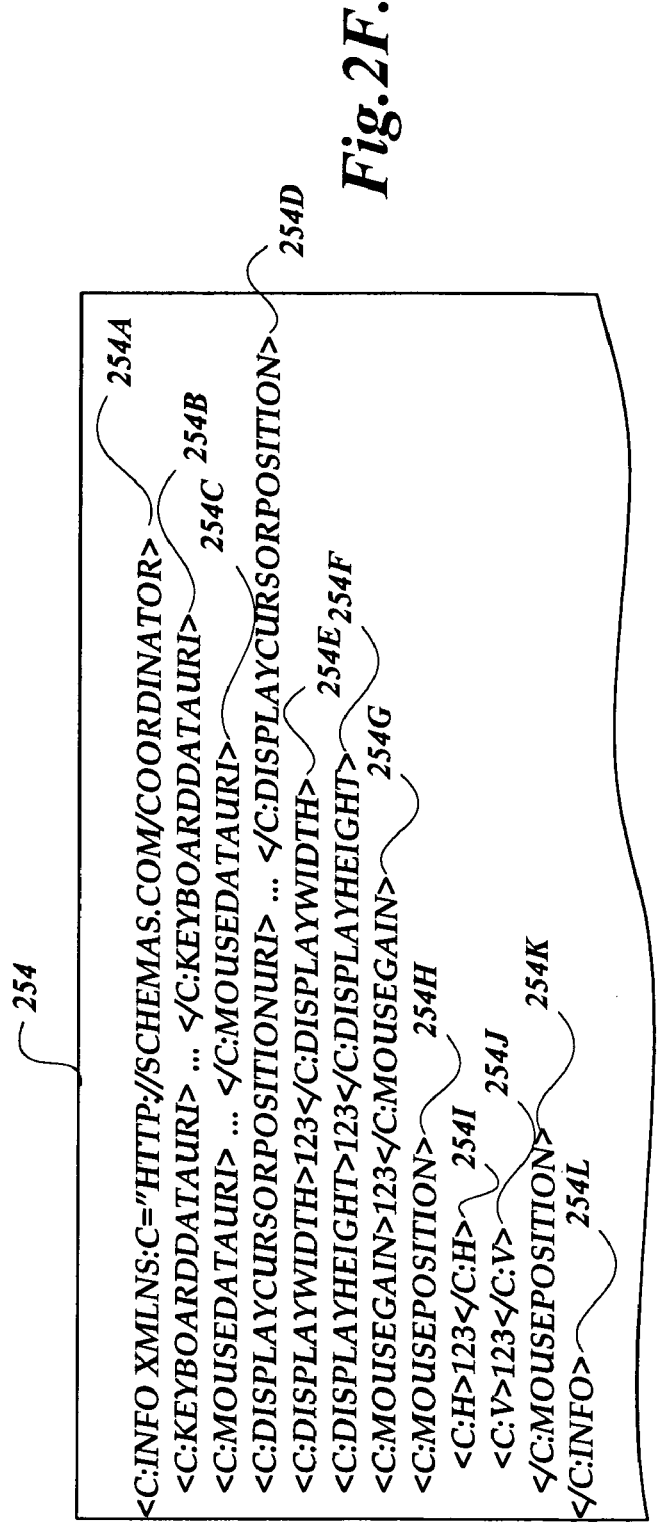
FIGS. 2F-2G are structured diagrams illustrating exemplary customizable, tag-based documents for the composed service illustrated in FIG. 2E.

FIG. 2F illustrates a customizable tag-based document 254 that holds the state of the composed service 228 including the state of the display service 212, the mouse service 214, and the keyboard service 216. The customizable, tag-based document 254 is producible by an info service (not shown) of the composed service 228. The customizable, tag-based document 254 includes an info element defined between a beginning tag 254A <C:INFO> and its companion ending tag 254L </C:INFO>. Between tags 254A, 254L is line 254B defining a tag <C:KEYBOARDDATAURI> for containing a URI to a data service of the keyboard service 216. Between tags 254A, 254L is line 254C defining a tag <C:MOUSEDATAURI> for containing a URI to a data service of the mouse service 214. Line 254D defines a tag <C:DISPLAYCURSORPOSITION-URI> for containing a URI to a cursor position service of the display service 212. Line 254E defines a tag <C:DISPLAYWIDTH> for containing the width of the display represented by the display service 212. Line 254F defines a tag <C:DISPLAYHEIGHT> for containing the height of the display being represented by the display service 212. Further embedded between tags 254A, 254L is a mouse position element between tag 254H <C:MOUSEPOSITION> and its companion ending tag 254K <C:MOUSEPOSITION>. Between tags 254H, 254K is line 254I for defining a tag <C:H> signifying the horizontal position of the mouse. Line 254J defines a tag <C:V> signifying the vertical position of the mouse.

Figure 2G:
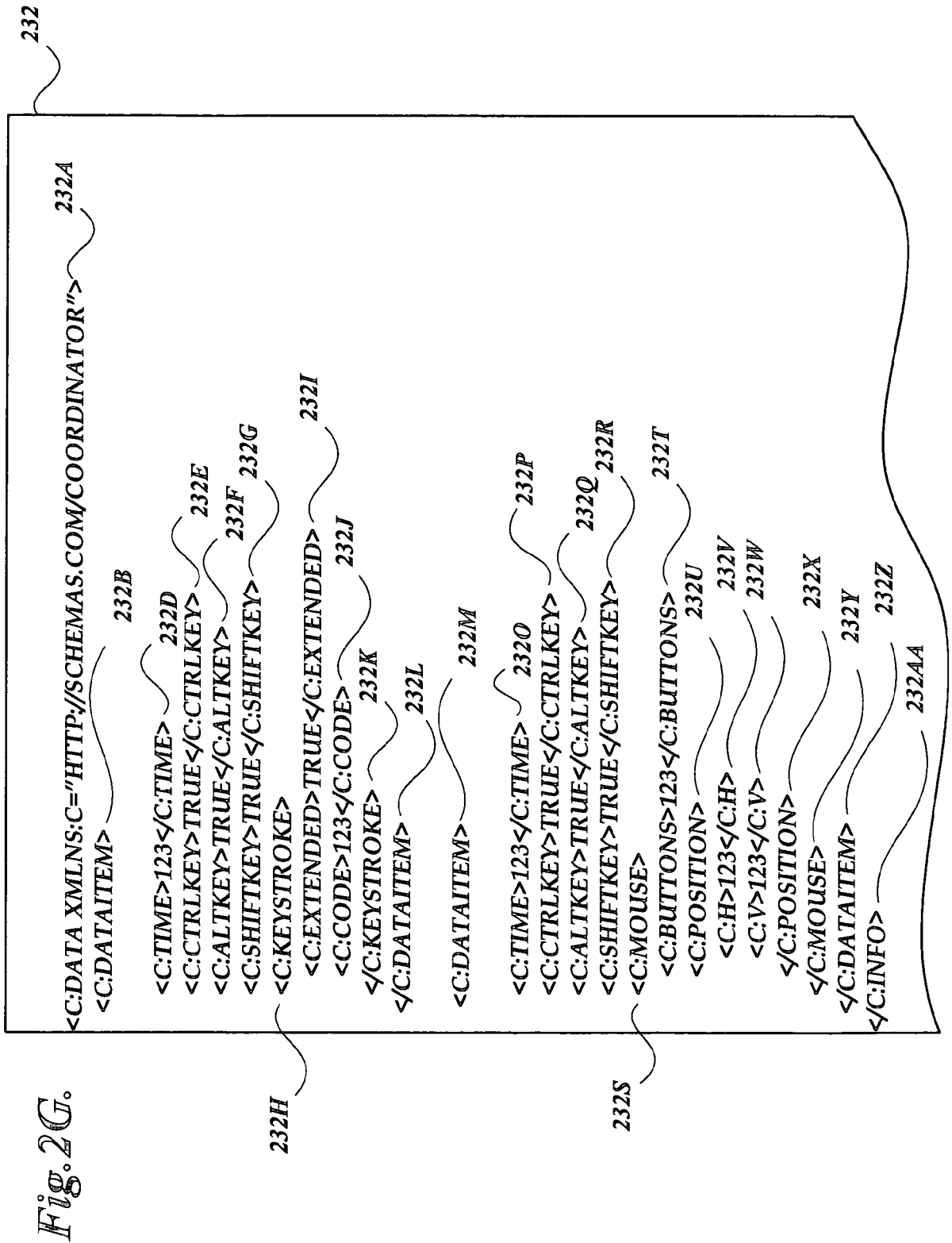

A customizable tag-based document 232 reproducible by a data service (not shown) of the composed service 228 is illustrated at FIG. 2G. The customizable tag-based document 232 holds the keyboard events and mouse events that have been generated by the mouse service 214 and the keyboard service 216 but which have not yet been consumed by the application service 226. The application service 226 normally subscribes to changes in the data service so that the application service 226 is informed when a new event is generated and has appeared in the data service of the composed service 228. The customizable, tag-based document 232 includes a data element defined between tag 232A <C:DATA> and its companion ending tag 232AA </C:INFO>. The tag 232A includes an attribute XMLNS:C for defining a name space and can be found at an address "HTTP://SCHEMAS.COM/COORDINATOR". Contained between tags 232A, 232AA are zero or more data item elements for capturing either a keyboard event generated by the keyboard service 216 or a mouse event generated by the mouse service 214. One exemplary keyboard event is defined between a tag 232B <C:DATAITEM> and its companion ending tag </C:DATAITEM> 232L. A time element is defined at line 232D by a tag <C:TIME>. The time element specified a time when the data item element was generated using system global time. The time element allows ease of understanding the sequence by which events happened. Even if times between events are small (e.g., mouse clicks) or the events occurred on different devices (e.g., control-click) lines 232E-232G capture the states of the modifier keys of the keyboard represented by the keyboard service 216. Line 232E CONTAINS the state of the control key via a tag <C:CTRLKEY>. Line 232F contains the state of the ALT key, which is defined by tag <C:ALTKEY>. Line 232G contains the state of the shift key via a tag <C:SHIFTKEY>.

An actuated key on the keyboard is captured by a keystroke element defined between a tag 232H <C:KEYSTROKE> and its companion ending tag 232K </C:KEYSTROKE>. Contained between tags 232H, 232K is an element defined by tag <C:EXTENDED> on line 232I, which contains a TRUE value if the code represented by the below-described <C:CODE> element is an extended code, such as a function key. Line 232J defines a tag <C:CODE> for containing the character code generated from the actuation of a key on the keyboard.

The customizable, tag-based document 232 includes zero or more mouse events. One exemplary mouse event is captured by a data item element defined between tag 232M <C:DATAITEM> and its companion ending tag 232Z </C:DATAITEM>. A time element is defined on line 232O by a tag <C:TIME>. The time element specifies the time when the data item element was generated. Lines 232P-232R include tags <C:CTRLKEY>, <C:ALTKEY>, and <C:SHIFTKEY> for capturing the state of modifier keys on the keyboard represented by the keyboard service 216. The shift key state is captured on line 232R by tag <C:SHIFTKEY>. The mouse event is captured between a tag 232S <C:MOUSE> and its companion ending tag 232Y </C:MOUSE>. If a mouse button was actuated, tag <C:BUTTONS> on line 232T captures the button code. Tag 232U <C:POSITION> and its companion ending tag 232X </C:POSITION> contain information pertaining to the position of the mouse. Line 232V describes tag <C:H> signifying the horizontal position of the mouse. Line 232W includes tag <C:V> signifying the vertical position of the mouse.

Figure 2H:
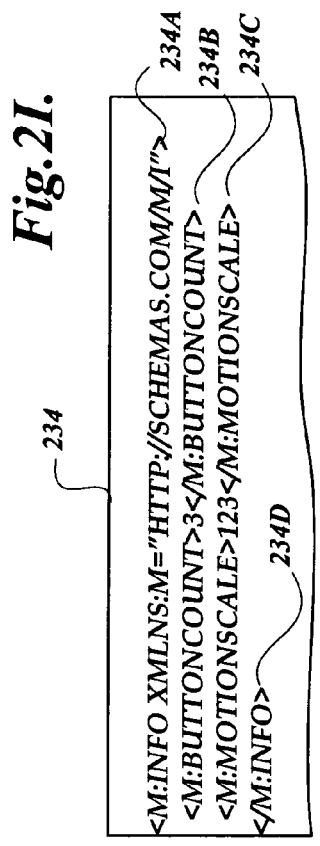
FIG. 2H is a block diagram illustrating an exemplary mouse service.

FIG. 2H illustrates the mouse service 214 as a service composed of an info service 214C with a port identifiable by an identifier (such as a URI) 214C-1 and a unilateral contract 214C-2; and a data service 214D with a port identifiable by an identifier (such as a URI) 214D-1 and a unilateral contract 214D-2. The mouse service 214 provides an interface to a mouse. As the physical state of the mouse is changed, such as the mouse being moved or a mouse button being pressed or released, a mouse event is inserted into the data service 214D by the mouse service 214. Although an application service, such as the application service 226, can directly read mouse events by polling the data service 214D, the application service 226 can avoid such manual reading by allowing the data service 214D to inform the application service 226 whenever there are changes. Preferably, mouse motion is reported as a relative change in whatever units are naturally generated by the encoders within the mouse. A finite number of mouse events can be inserted into the data service 214D. If the data service 214D already contains as many events as the data service 214 can handle, new mouse events are preferably discarded.

Figure 2I:
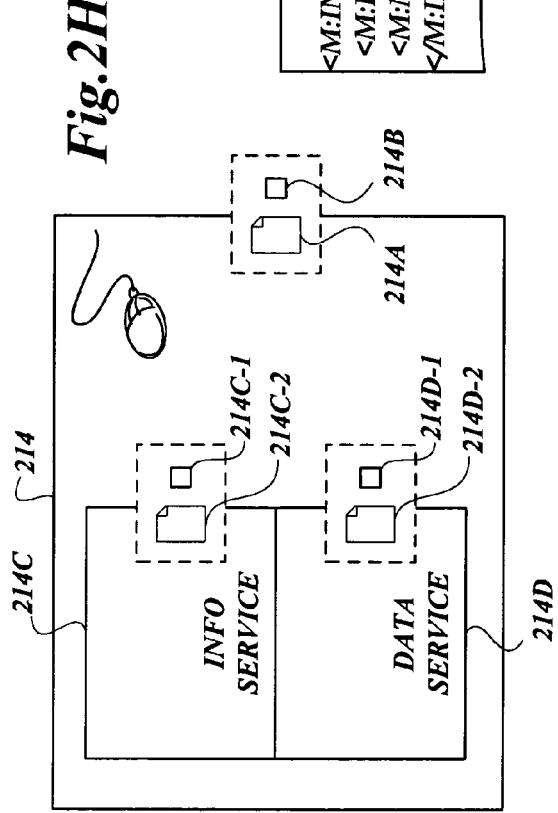
FIGS. 2I-2J are structured diagrams illustrating customizable, tag-based documents relating to the mouse service illustrated in FIG. 2H.

A customizable, tag-based document 234 producible by the info service 214C upon request is illustrated at FIG. 2I. The info service 214C holds a summary of the properties of the mouse that the mouse service 214 represents. A tag 234A <M:INFO> includes an attribute XMLNS:M for defining a name space for the mouse service 214. The attribute XMLNS:M is defined to include an address "HTTP://SCHEMAS.COM/M/I". Line 234B defines tag <M:BUTTONCOUNT> which is indicative of the number of buttons on the mouse represented by the mouse service 214. The application service 226 may use the tag <M:BUTTONCOUNT> to configure its user interface. Line 234C defines tag <M:MOTIONSCALE> which is indicative of the scale of mouse motion events preferably in shaft encoder units per some suitable linear dimension. One suitable linear dimension includes inches, but others may be used.

Figure 2J:
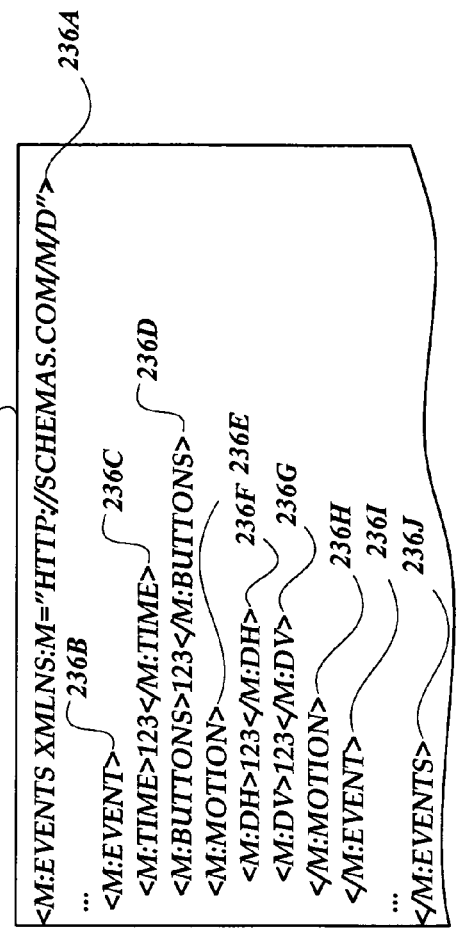

FIG. 2J illustrates a customizable, tag-based document 236 which is managed by the data service 214D for holding mouse events not yet consumed by the application service 226. A tag 236A <M:EVENTS> and its companion ending tag 236J </M:EVENTS> define an events element. Contained between tags 236A, 236J are zero or more event elements. One exemplary event element is defined between tag 236B <M:EVENT> and its companion ending tag </M:EVENT> 236I. A time element defined by a tag <M:TIME> on line 236C specifies the time when the event element was generated using system global time. The time element allows ease of understanding the sequence in which events happen. Line 236D defines tag <M:BUTTONS> which is preferably an unsigned integer whose bits are interpreted to specify the state of the mouse buttons. Preferably, the left button is identified as the numeral 4 in decimal digits. The middle button is identifiable as the numeral 2 in decimal digits, and the right button is identifiable as the numeral 1 in decimal digits. If the buttons element defined by tag <M:BUTTONS> is missing, the application service 226 may interpret that the state of the mouse buttons has not changed since the last mouse event. If the buttons element defined by tag <M:BUTTONS> is present, the application service 226 may interpret that the state of the mouse buttons may have changed since the last mouse event. Tag 236E <M:MOTION> and its companion ending tag 236H </M:MOTION> specify how much the mouse has moved in terms of shaft encoder units since the last mouse event. If the motion element defined by tag 236E is missing, the application service 226 may interpret that the mouse has not moved since the last mouse event. Between tags 236E, 236H is tag 236F <M:DH> for indicating the delta change in the horizontal motion of the mouse. Tag 236G <M:DV> indicates the delta change in the vertical motion of the mouse.

A keyboard service 216 as a composed service is formed from an info service 216C with a port identifiable by an identifier (such as a URI) 216C-1 and a unilateral contract 216C-2; and a data service 216D with a port identifiable at URI 216D-1 and a unilateral contract 216D-2. See FIG. 2K. The keyboard service 216 provides an interface to a standard keyboard. When a key is actuated or a modifier key is pressed or released, a keyboard event is self-inserted into the data service 216D. The application service 226 can directly request generated events from the data service 216D or the application service 226 can ask the data service 216D to automatically inform the application service 226 of any changes in its event store. Normal key actuations are preferably generated as Unicode characters. To allow keyboard events to be generated by things that are not actually keyboards (e.g., a virtual keyboard on a display), the release of normal key actuations is preferably not reported. A finite number of keyboard events can be inserted into the data service 216D. If the maximum number of events have already been contained, the data service 216D preferably discards the new keyboard events.

FIG. 2L illustrates a customizable, tag-based document 238 which acts as an event store for the data service 216D. Tag 238A <K:EVENTS> and its companion ending tag 238M </K:EVENTS> define an events element that contains zero or more event elements pertaining to keyboard events. The tag 238A includes an attribute XMLNS:K for defining a name space for the keyboard service 216. The attribute XMLNS:K contains the address "HTTP://SCHEMAS.COM/K/D". An exemplary event element is defined between tag 238B <K:EVENT> and its companion ending tag 238L </K:EVENT>. A time element is defined by tag 238C <K:TIME> for specifying the time when the event element was generated, preferably using system global time. The time element allows the application service 226 to understand the sequence in which events happened. Tag 238D <K:CTRLKEY> indicates the state of the control key on the keyboard. Tag 238E <K:ALTKEY> signifies the state of the ALT key on the keyboard, which is used in conjunction with another key to produce some special feature or function and is typically marked with the letters ALT. Tag 238F defines another modifier key <K:SHIFTKEY>, which signifies a keyboard key that (when pressed in combination with another key) gives that key an alternate meaning; for example, producing an uppercase character when a letter key is pressed. Tag 238G <K:WINDOWKEY> contains the state of the window key. The appearance of tags 238D-238G in the event element defined between tags 238B, 238L is optional. If the tags 238D-238G are not present, the application service 226 can infer that the state of the modifier keys has not changed since the last keyboard event. If one of the modifier tags 238D-238G is present, the application service 226 can infer that the state of one of the modifier keys may have changed since the last keyboard event. Tag 238H <K:KEY> and its companion ending tag 238K </K:KEY> define the state of a keystroke. Between tags 238H, 238K is tag 238I <K:SPECIALCODE>. If it contains the default FALSE value, then the tag 238J <K:CODE> contains a Unicode character. Otherwise, the tag 238I contains a TRUE value, and the tag 238J <K:CODE> contains a special key code. Keys like TAB and ENTER are reported as special key codes (tag 238I <K:SPECIALCODE> is set to TRUE) so that it may be possible to tell the difference between things like TAB and "CTRL+I".

A customizable, tag-based document 240, which is produced by the info service 216C upon request, is illustrated at FIG. 2M. A tag 240A <K:INFO> and its companion ending tag 240F </K:INFO> define an info element. The info element includes an attribute for defining the namespace of the keyboard service 216. The attribute is XMLNS:K containing an address "HTTP://SCHEMAS.COM/K/I". Contained between tags 240A, 240F is a tag 240B <K:HASFUNCTIONKEYS>, which has the value TRUE if the keyboard has function keys, such as keys labeled F1 through F12. A tag 240C <K:HASNAVIGATIONKEYS> is set to TRUE if the keyboard has navigation keys, such as the four arrow keys, the INSERT key, the DELETE key, the HOME key, the END key, and the PAGE UP and PAGE DOWN keys. Tag 240D <K:HASNUMERICPADKEYS> is set to TRUE if the keyboard has a numeric keypad. State changes of the NUMLOCK key are not reported to the application service 226. Instead, the NUMLOCK key, which modifies the codes sent by other keys in the numeric keypad, is processed completely by the keyboard service 216. Tag 240E <K:HASWINDOWSKEYS> is set to TRUE if the keyboard has Windows keys.

Figure 2N:
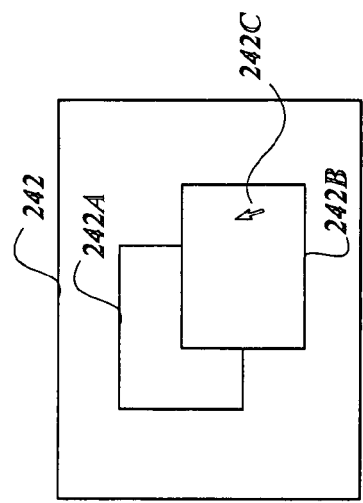
FIG. 2N is a block diagram illustrating an exemplary display with windows painted on the display.

FIG. 2N illustrates a display 242 that comprises a window 242A and a window 242B overlapping one another. Each window 242A, 242B has its own boundaries and can contain a different document or another view into the same document. An on-screen cursor 242C is a special indicator, such as an arrowhead leaning slightly to the left, that marks the place to which the mouse has moved. The display 242 is an output device and is preferably represented by a display service 212, which is a composed service formed from services 212C-212H. The display service 212 provides an interface to the display 242. All drawings on the screen are preferably performed within windows, such as windows 242A, 242B, which are rectangular areas of the display 242. Each window preferably has its own unique set of URIs and each holds a set of pixels which can be specified in a variety of ways. The application service 226 creates and modifies the attributes of windows 242A, 242B by sending customizable, tag-based messages to the display service 212.

Figure 2O:
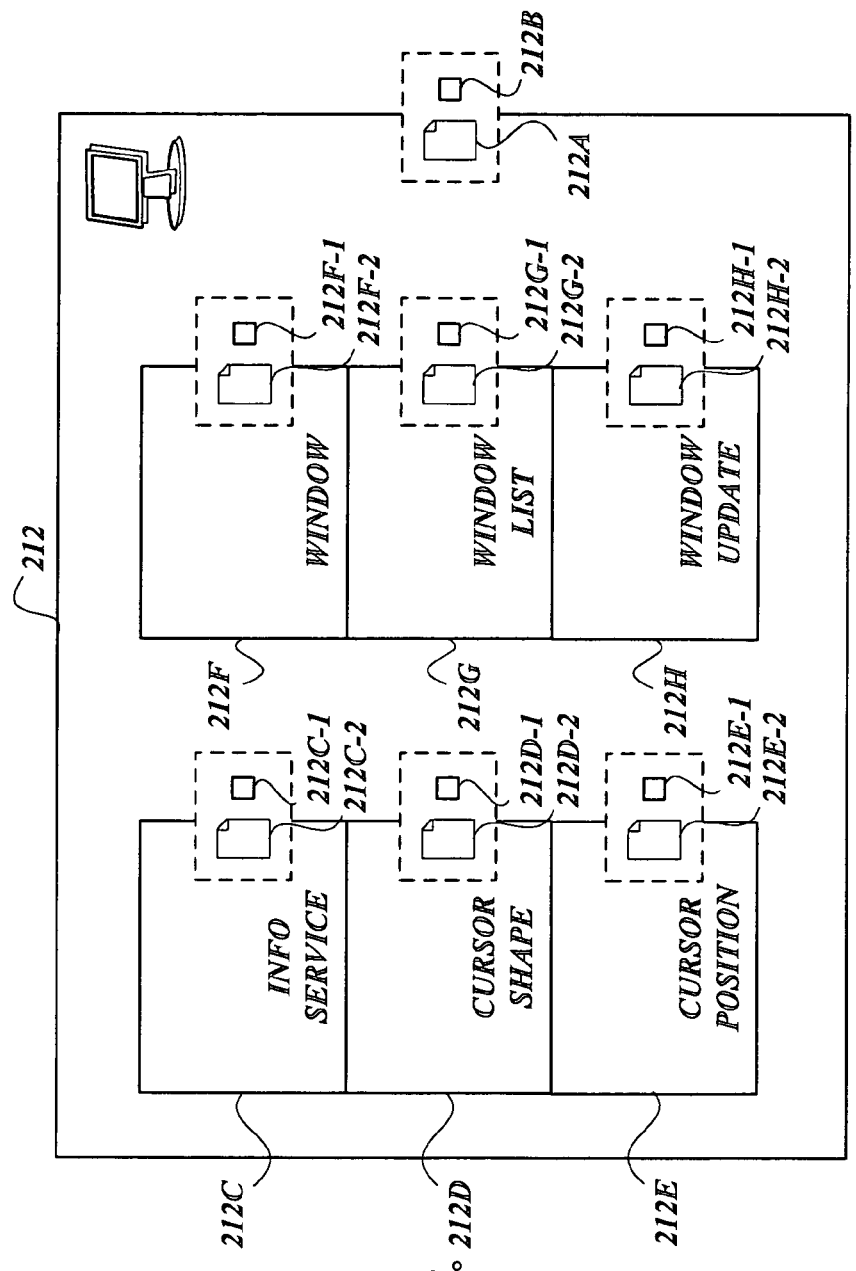
FIG. 2O is a block diagram illustrating an exemplary display service.
Figure 3A:
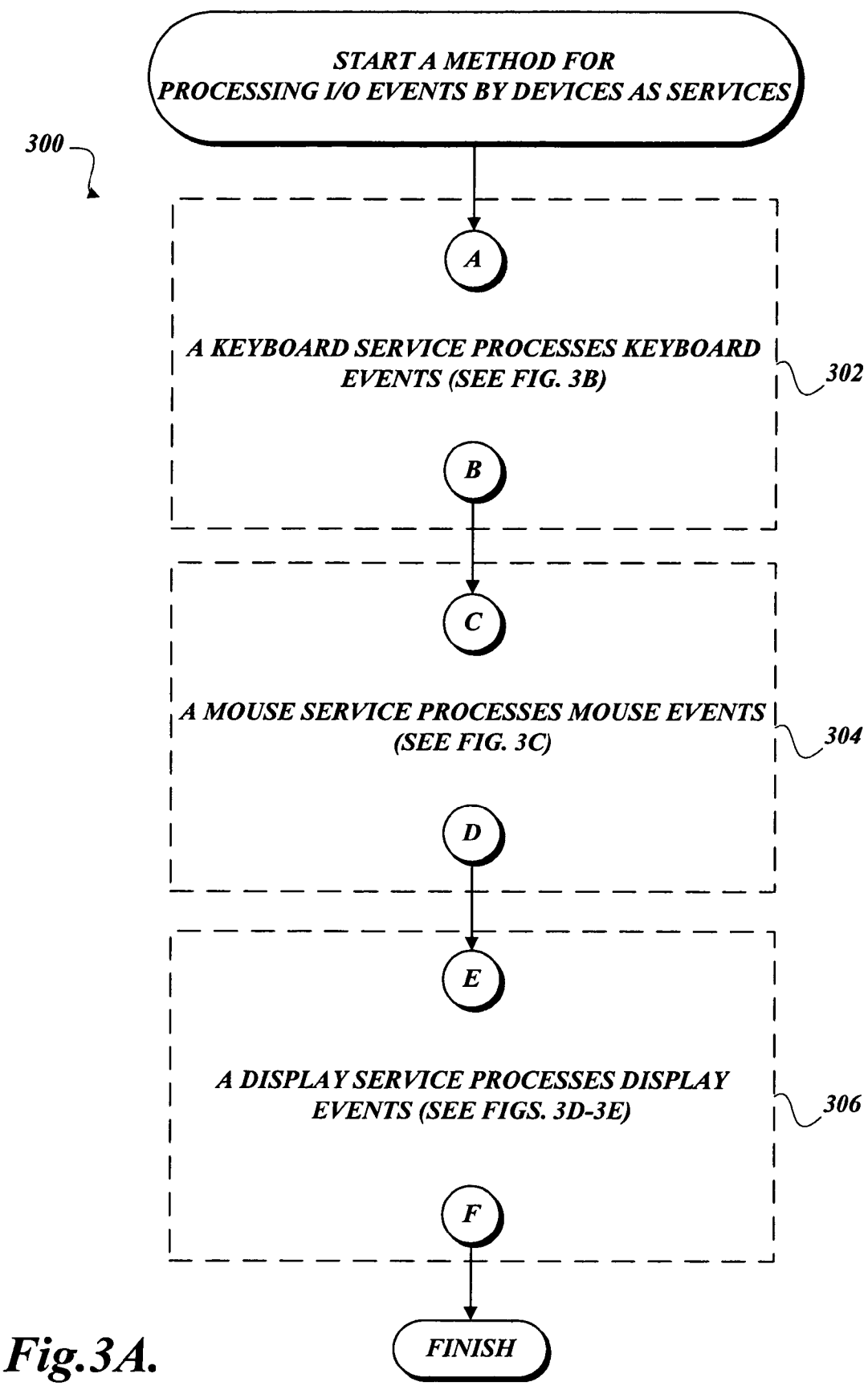
FIGS. 3A-3E are process diagrams illustrating a method for processing I/O events by devices as services in a decentralized operating system.
Figure 3B:
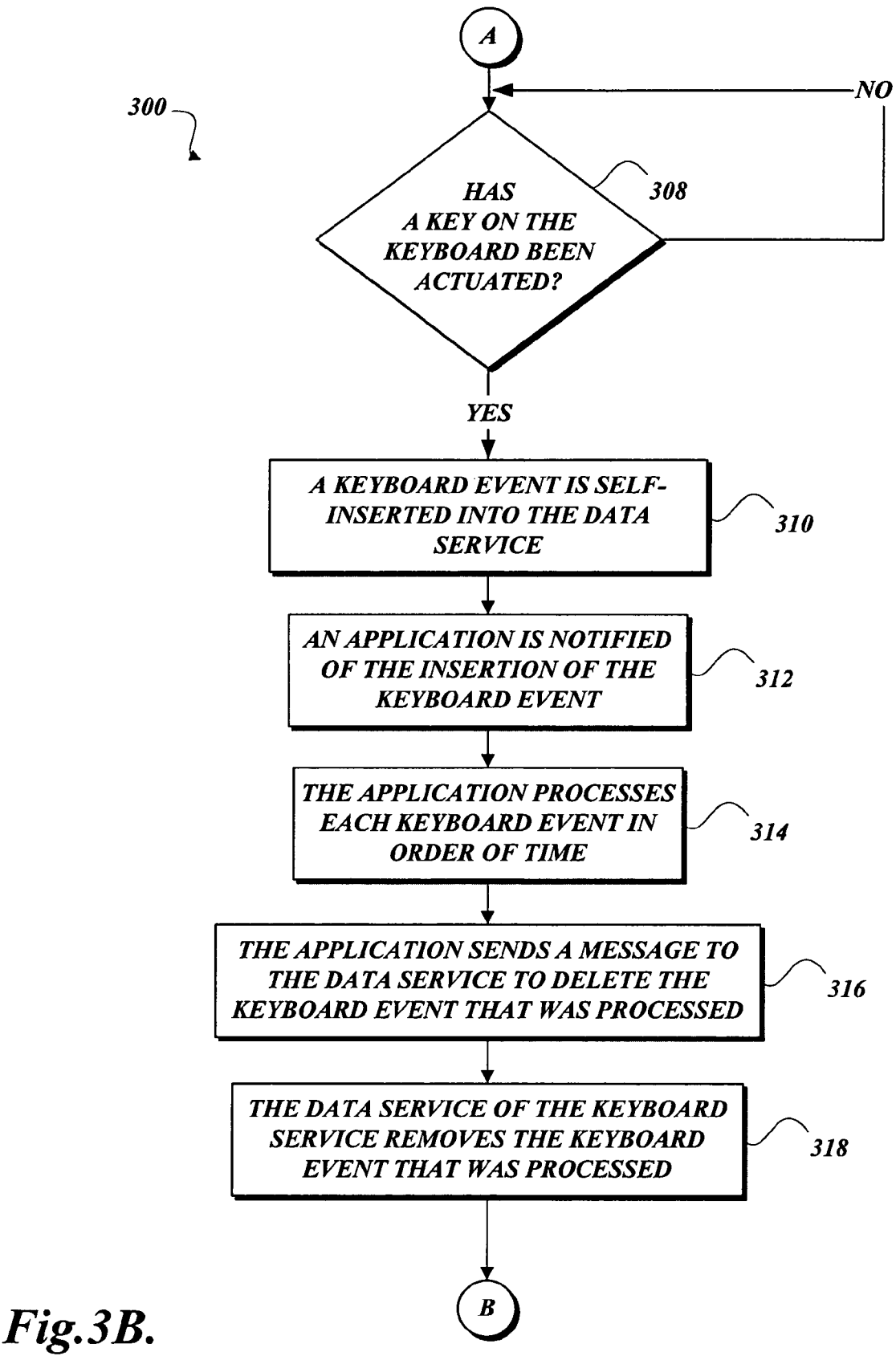
Figure 3C:
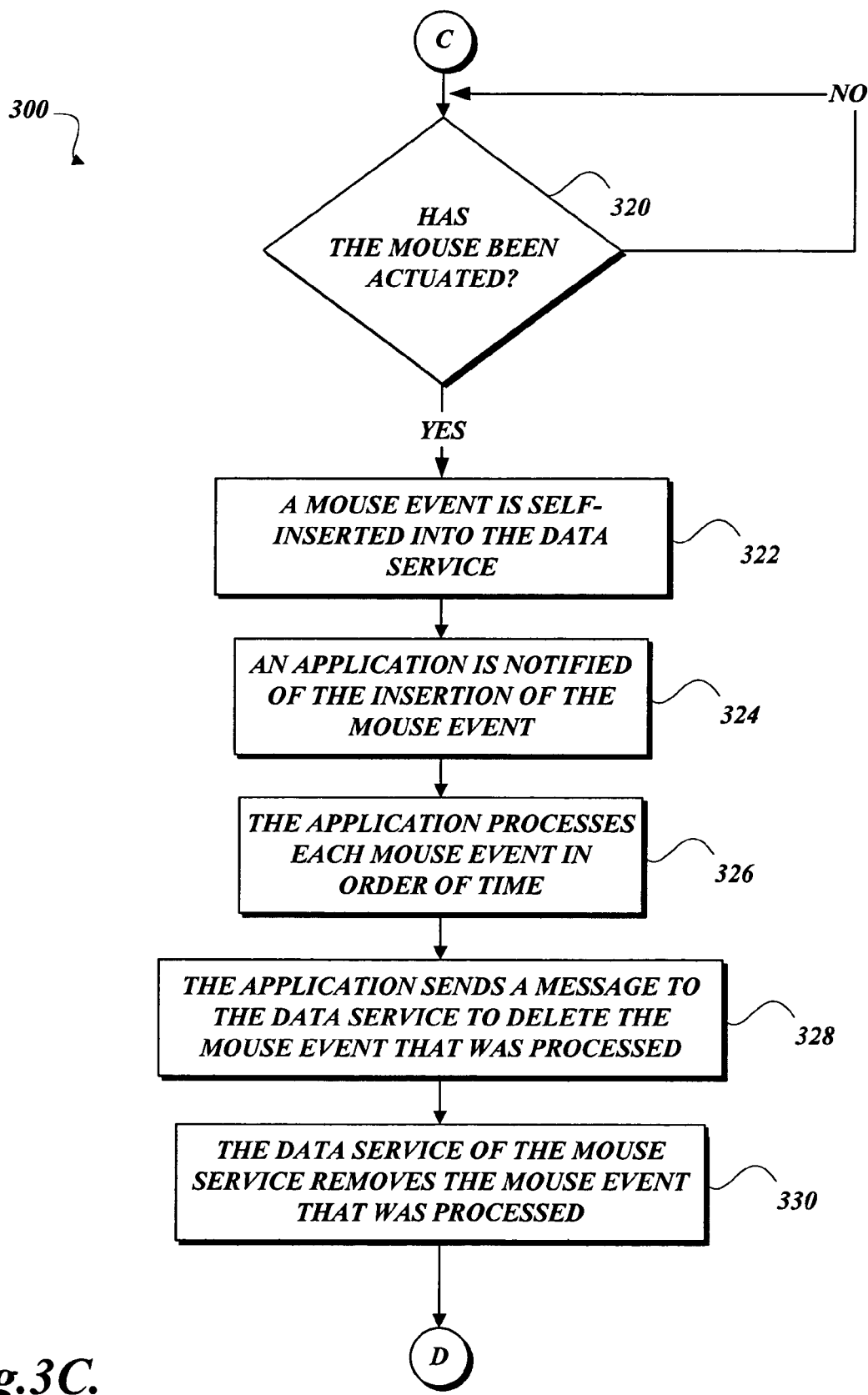
Figure 3D:
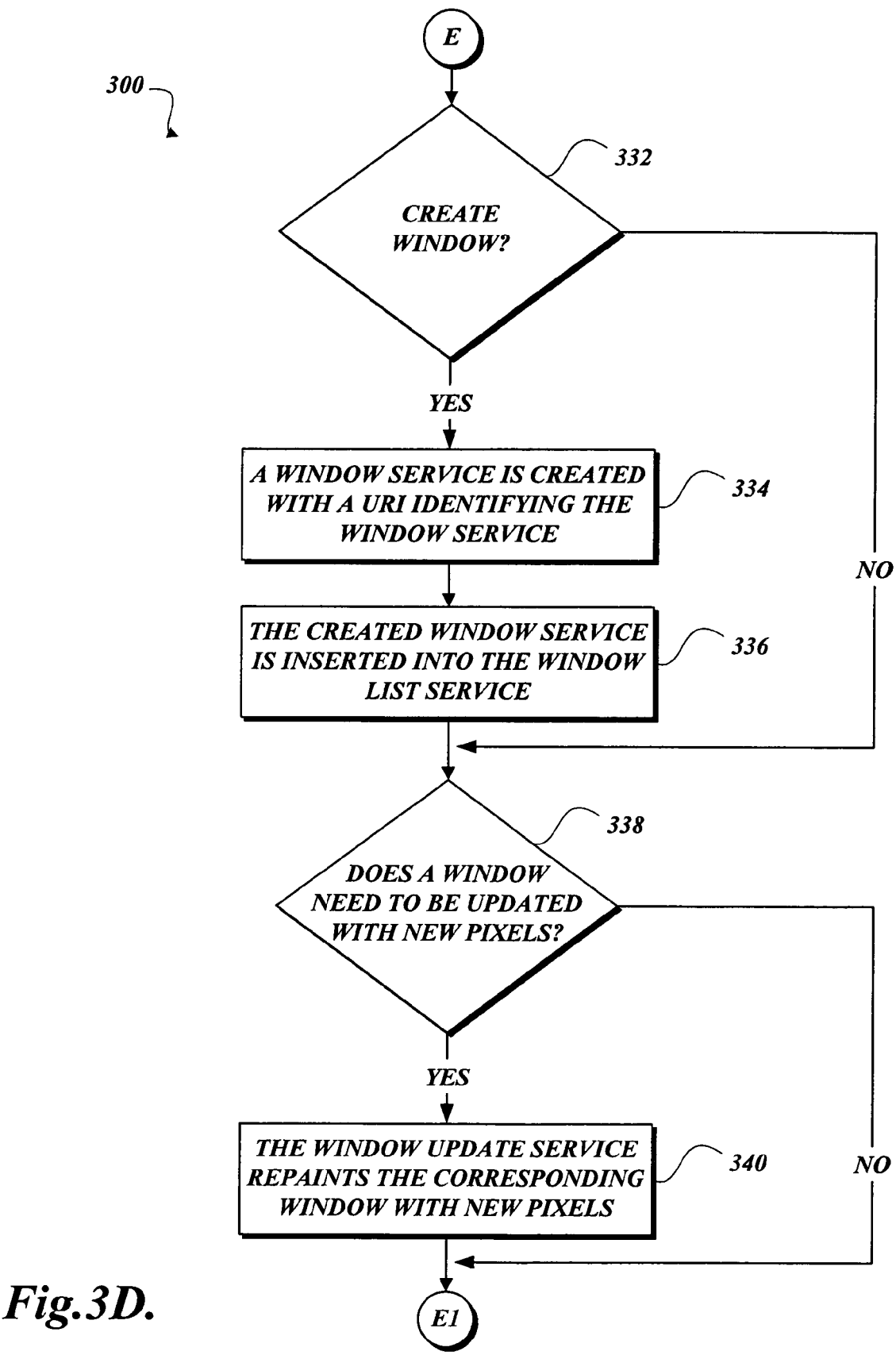
Figure 3E:
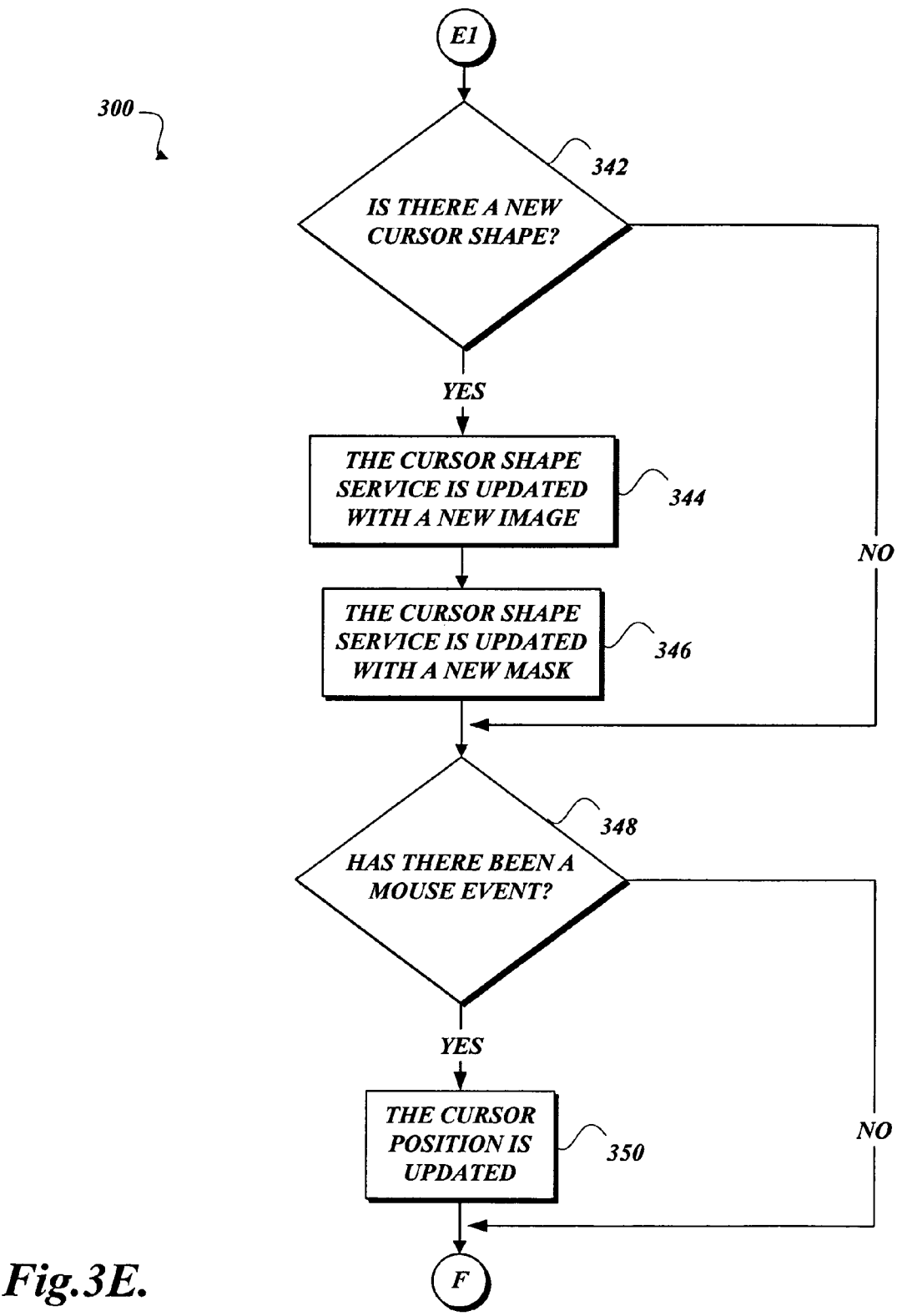

The display service 212 includes an info service 212C with a port identifiable with a URI 212C-1 and a unilateral contract 212C-2. See FIG. 2O. The info service 212C includes a customizable, tag-based document 244. See FIG. 2P. A tag 244A <D:INFO> and its companion ending tag 244E </D:INFO> define an info element holding a summary of the properties of the display 242. Tag 244B <D:W> contains the size of the width of the screen of the display 242 in pixels. Tag 244C <D:H> describes the size of the height of the screen of the display 242 in pixels. Tag 244D <D:FORMAT> describes the native pixel format of the screen of the display 242.

The display service 212 includes a cursor shape service 212D with a port identifiable by an identifier (such as a URI) 212D-1 and a unilateral contract 212D-2. See FIG. 2O. The cursor shape service 212D describes the current shape of the on-screen cursor 242C. The shape is described by a customizable, tag-based document 246. See FIG. 2Q. Tag 246A <D:SHAPE> and its companion ending tag 246G </D:SHAPE> define a shape element for the on-screen cursor 242C. Tag 246B <D:IMAGE> preferably contains a 128-byte block of image data (encoded using base-64 notation), which represents a 32×32 two-level bitmap. The data is preferably in network byte order so that the most significant bit of byte 0 corresponds to location (0,0) of the bitmap, and the least significant bit of byte 2127 corresponds to location (31,31) of the bitmap. Tag 246C <D:MASK> also holds a 128-byte block of data (encoded using base-64 notation), which represents a 32×32 two-level bitmap. Again, the data of the mask element defined by tag 246C is preferably in network byte order so that the most significant bit of byte 0 corresponds to location (0,0) of the bitmap, and the least significant bit of byte 127 corresponds to location (31,31) of the bitmap. The bitmap of the mask element specifies which pixels are actually part of the on-screen cursor 242 (a 1 means the pixel is valid). The bitmap of the image element specifies the actual pixels (0 means black and 1 means white). The on-screen cursor 242C can be hidden by specifying a bitmap for the mask element where all bits are 0. Tag 246D <D:HOTSPOT> and its companion ending tag 246H </D:HOTSPOT> specify the offset between the cursor hotspot (which is the location actually coupled to the current location of the mouse) and the location (0,0) of the cursor bitmaps. Preferably, this will be a location within the cursor bitmaps, but the offsets are signed and so the hotspot can be outside the bitmaps in any direction. Between tags 246D, 246H is tag 246E <D:DH> for defining the horizontal offset. Tag 246F <D:DV> defines the vertical offset for the hotspot element.

The display service 212 includes a cursor position service 212E with a port identifiable by an identifier (such as a URI) 212E-1 and a unilateral contract 212E-2. See FIG. 2O. A customizable, tag-based document 248 describes the current, preferably absolute, position of the on-screen cursor 242C. See FIG. 2R. Tag 248A <D:POSITION> and its companion ending tag 248D </D:POSITION> define a position element. Between tags 248A, 248D is tag 248B <D:H> for defining the horizontal position of the on-screen cursor 242C. The vertical position of the on-screen cursor 242C is defined by tag 248C <D:V>. The tag 248A includes an attribute XMLNS:D, which is defined to contain an address "HTTP://SCHEMAS.COM/P/P".

The display service 212 includes one or more window services 212F with a port identifiable by an identifier (such as a URI) 212F-1 and a unilateral contract 212F-2. See FIG. 2O. Each instantiation of the window service 212F represents each corresponding window 242A, 242B. The window service 212F includes a customizable, tag-based document 250 for describing a window 242A, 242B that it is representing. See FIG. 2S. Tag 250A <D:WINDOW> and its companion ending tag 250H </D:WINDOW> define a window element.

Tag 250A includes an attribute XMLNS:D for defining the name space for the window element. The attribute XMLNS:D is equated to an address "HTTP://SCHEMAS.COM/D/W". Between tags 250A, 250H is tag 250B <D:URI> for containing the info service URI 212C-1 of the display 242, upon which the window 242A, 242B being represented by the window service 212F is displayed. Tag 250C <D:T> and tag 250D <D:L> describe the coordinates of the top left corner of the window 242A, 242B on the screen of the display 242. The top left corner of the window 242A, 242B is preferably on the screen of the display 242. Tag 250E <D:W> and tag 250F <D:H> describe the size of the window 242A, 242B. If either the tag 250E or the tag 250F contain the zero value, then the window 242A, 242B covers no pixels on the screen of the display 242 and is invisible. Tag 250G <D:DROPTIME> describes the automatic drop time for the window 242A, 242B. If the value of the drop time element defined by tag 250G is non-zero, the window 242A, 242B is automatically deleted if the value of the drop time element is less than the current system global time.

The display service 212 includes a window list service 212G with a port identifiable by an identifier (such as a URI) 212G-1 and a unilateral contract 212G-2. See FIG. 2O. The window list 212G is used to maintain a list of windows 242A, 242B, which are actually shown on the screen of the display 242 in window stack order. The window list service 212G includes a customizable, tag-based document 252 for describing the order of presentation of windows 242A, 242B. See FIG. 2T. Tag 252A <D:WINDOWS> and its companion ending tag 252D </D:WINDOWS> define the windows element. One or more tags <D:URI> 252B, 252C contain the URI of a window service, such as the window service URI 212F-1. Tags 252B, 252C define two URI elements. The order of the URI elements defines the window stack order on the display 242. The first URI element in the list indicates that the window is at the front of the stack and the last URI element in the list indicates that the window is at the back of the stack.

The display service 212 includes one or more window update services 212H with a port identifiable by an identifier (such as a URI) 212H-1 and a unilateral contract 212H-2. See FIG. 2P. The application service 226 changes the pixels associated with the window 242A, 242B by creating a window update service 212H with an appropriate unilateral contract 212H-2, associating the window update service 212H with the window 242A, 242B, and sending an update request to the window update service 212H to refresh or repaint the window 242A, 242B. Preferably, each format of data from the application service 226 has its own type of window update service 212H, each with its own unilateral contract 212H-2. Preferably, all of the parameters needed to change the pixels associated with the window 242A, 242B are part of the state of the window update service 212H.

FIGS. 3A-3F illustrate a method 300 for processing I/O events by devices as services. For clarity purposes, the following description of the method 300 makes references to various elements illustrated in connection with the mouse service 214 (FIG. 2I), the keyboard service 216 (FIG. 2L), and the display service 212 (FIG. 2P). From a start block, the method 300 proceeds to a set of method steps 302, defined between a continuation terminal ("terminal A") and an exit terminal ("terminal B"). The set of method steps 302 describes the process by which a keyboard service processes keyboard events (see FIG. 3B).

From terminal A (FIG. 3B), the method 300 proceeds to decision block 308 where a test is made to determine whether a key on the keyboard has been actuated. If the answer is NO, the method 300 loops back to decision block 308 and repeats the above-described processing step. Otherwise, if the answer to decision block 308 is YES, the method 300 proceeds to block 310 where a keyboard event is self-inserted into the data service 216D. At block 312, the application service 226 is notified of the insertion of the keyboard event. The application service 226 processes each keyboard event in order of time. See block 314. The method 300 proceeds to block 316 where the application service 226 sends a message to the data service 216D to delete the keyboard event that was processed. At block 318, the data service 216D of the keyboard service 216 removes the keyboard event that was processed. The method 300 then enters the exit terminal B.

From exit terminal B (FIG. 3A), the method 300 proceeds to a set of method steps 304, defined between a continuation terminal ("terminal C") and an exit terminal ("terminal D"). The set of method steps 304 describes the process by which a mouse service 214 processes mouse events (see FIG. 3C).

From terminal C (FIG. 300), the method 300 proceeds to decision block 320 where a test is made to determine whether the mouse has been actuated. If the answer to the test at decision block 320 is NO, the method 300 loops back to decision block 320 where the above-described processing step is repeated. Otherwise, the answer to the test at decision block 320 is YES, and the method 300 proceeds to block 322 where the mouse event is self-inserted into the data service 214D. At block 324, the application service 226 is notified of the insertion of the mouse event. The application service 226 processes each mouse event in order of time. See block 326. The method 300 proceeds to block 328, where the application service 326 sends a message to the data service 214D to delete the mouse event that was processed. At block 330, the data service 214D of the mouse service 214 removes the mouse event that was processed. The method 300 continues to exit terminal D.

From exit terminal D (FIG. 3A), the method 300 proceeds to a set of method steps 306, defined between a continuation terminal ("terminal E") and an exit terminal ("terminal F"). The set of method steps 306 describes the process by which a display service 212 processes display events (see FIGS. 3D-3F).

From terminal E (FIG. 3D), the method 300 proceeds to decision block 332 where a test is made to determine whether to create a window. If the answer to the test at decision block 332 is YES, the method 300 proceeds to block 334 where the window service 212F is created with the URI 212F-1 identifying the window service 212F. At block 336, the created window service 212F is inserted into the window list service 212G by the application service 226, and thereby, controlling the stacking order of the windows 242A, 242B, on the screen of the display 242. If the answer to the test at decision block 332 is NO, the method 300 proceeds to another decision block 338. From block 336, the method 300 also continues to decision block 338. At decision block 338, a test is made to determine whether a window 242A, 242B needs to be updated with new pixels. If the answer is YES, the applicaion service 226 sends the desired update to the window update service 212H and the window update service 212H repaints the corresponding window 242A, 242B with new pixels. See block 340. If the answer to the test at decision block 338 is NO, the method proceeds to another continuation terminal ("terminal E1").

From terminal E1 (FIG. 3E), the method 300 proceeds to decision block 342 where a test is made to determine whether there is a new cursor shape. If the answer is yes, the cursor shape service 212D is updated with a new image. At block 346, the cursor shape service 212D is updated with a new mask. From block 346, the method 300 proceeds to another decision block 348. If the answer is NO to decision block 342, the method 300 also continues to decision block 348. A test is made at decision block 348 to determine whether there has been a mouse event. If the answer to the test at decision block 348 is YES, the position of the on-screen cursor 242C is updated. See block 350. If the answer to the test at decision block 348 is NO, the method continues to another continuation terminal ("terminal E2"). From block 350, the method 300 also continues to the exit terminal F. From terminal F (FIG. 3A), the method 300 terminates execution.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a networked system, a device that is a computer subsystem, the device comprising:
    one or more services executing in the device, each service including:
        an information service, the information service being configured to produce a customizable tag-based document that holds a summary of device properties that a device service represents, the information service being further configured to store the customizable tag-based document until requested by an application service;
        a data service, the data service being configured to produce a customizable tag-based document that holds events which have been generated by the one or more services but not yet consumed by the application service, the customizable tag-based document holding a state of the one or more services, the data service being further configured to store the customizable tag-based document until requested by the application service;
    wherein each service including:
        a port identifiable by an identifier that includes a unique designation of an operating system service or another service, the port of the service endued with behavioral types specified by a unilateral contract; and
        the unilateral contract for describing one or more behaviors of the service, wherein the one or more behaviors are described by behavior sentences, and further wherein the unilateral contract specifies:
            regulation of the service by specifying attaching behavioral conditions to files to govern access control;
            an order of messages that flow in or out of the service;
        creation of an instance of communication, after being accepted by an external second service, between the service and the external second service, the external second service agreeing to perform the unilateral contract according to the order of messages specified in the unilateral contract.

2. The device of claim 1, wherein the data service being capable of responding to queries regarding the events.

3. The device of claim 1, further comprising a network device driver that enables communication between services.

4. The device of claim 1, further comprising a decentralized operating system on which the one or more services are executed.

5. A computer-readable recording medium storing thereon computer-executable services comprising:
    a terminal service comprising a display service that includes a cursor shape service with a port identifiable by an identifier; and the computer-readable medium also storing thereon computer-readable information comprising:

a customizable tag-based document that describes a shape of an on-screen cursor, the customizable tag-based document including image data specifying pixels that comprise the on-screen cursor, the customizable tag-based document also holding a state of the service representing a device for an input/output event and a state of the input/output event that has been generated by the service representing the device;

a unilateral contract for describing one or more behaviors of the display service and specifying regulation of the display service by specifying attaching behavioral conditions to files to govern access control, wherein the one or more behaviors associated with a service are described by behavior sentences, wherein the unilateral contract is accepted when another service promises to perform the unilateral contract in accordance with the one or more behaviors or when the other service performs the unilateral contract in accordance with the one or more behaviors, and wherein acceptance of the unilateral contract creates an instance of communication between the display service and another service.

6. The computer-readable recording medium of claim 5, wherein the display service includes a cursor position service for describing the position of an on-screen cursor, the cursor position service including a port identifiable by an identifier that includes a uniform resource identifier and a unilateral contract for describing one or more behaviors of the cursor position service.

7. The computer-readable recording medium of claim 5, wherein the display service includes a window service for describing a window, the window service including a port identifiable by an identifier that includes a uniform resource identifier and a unilateral contract for describing one or more behaviors of the window service.

8. The computer-readable recording medium of claim 7, wherein the display service includes a window list service for containing a list of window services appearing on a display, the window list service including a port identifiable by an identifier that includes a uniform resource identifier and a unilateral contract for describing one or more behaviors of the window list service.

9. The computer-readable recording medium of claim 8, wherein the display service includes a window update service for refreshing a window represented by a window service, the window update service including a port identifiable by an identifier that includes a uniform resource identifier and a unilateral contract for describing one or more behaviors of the window update service.

10. The computer-readable recording medium of claim 5, wherein the terminal service further comprises a keyboard service with a port identifiable by an identifier that includes a uniform resource identifier and a unilateral contract for describing one or more behaviors of the keyboard service.

11. The computer-readable recording medium of claim 10, wherein the keyboard service includes a data service for containing keyboard events generated by a keyboard, the data service being capable of responding to queries to remove keyboard events for processing.

12. The computer-readable recording medium of claim 5, wherein the terminal service further comprises a mouse service, the mouse service including a port identifiable by an identifier that includes a uniform resource identifier and a unilateral contract for describing one or more behaviors of the mouse service.

13. The computer-readable recording medium of claim 12, wherein the mouse service includes a data service for containing mouse events generated by a mouse, the data service being capable of responding to queries to remove mouse events for processing.

14. A computer-implemented method for processing input/output events by devices as services, the method comprising:

requesting, by a computing system configured to represent devices as services in a decentralized operating system, a service representing a device for an input/output event, the service including a port identifiable by an identifier that includes a uniform resource identifier and a unilateral contract for describing one or more behaviors of the service, the unilateral contract expressed in a language specifying an order of messages that flow in or out of services;

receiving a customizable tag-based document that describes a shape of a cursor, the customizable tag-based document including image data comprising a bitmap image and a bitmap mask specifying pixels that comprise the cursor and offset data specifying an offset between the pixels and a location pointed to by the cursor;

requesting the service to change a cursor shape, the act of requesting invoking a cursor shape service that changes the shape of the cursor based at least in part on the customizable tag-based document;

receiving a customizable tag-based message that contains a state of the service representing the device and the input/output event that has been generated by the service representing the device; and requesting the service to remove the input/output event.

15. The method of claim 14, further comprising requesting the service for creating a window, the act of creating a window creating a window service with a port identifiable by an identifier that includes a uniform resource identifier and a unilateral contract for describing one or more behaviors of the window service.

16. The method of claim 15, further comprising requesting the service for refreshing the window, the act of requesting invoking a window update service that repaints the window.

17. The method of claim 14, further comprising requesting the service to change a position of a cursor, the act of requesting invoking a cursor position service that changes the position of the cursor.

18. A computer-readable recording medium storing computer-executable instructions for implementing a computer-implemented method for processing input/output events by devices as services, the method comprising:

requesting a service representing a device for an input/output event, the service including a port identifiable by an identifier that includes a uniform resource identifier and a unilateral contract for describing one or more behaviors of the service, wherein the one or more behaviors are described by behavior sentences, wherein the unilateral contract specifies an order of messages that flow in or out of services, wherein the unilateral contract is accepted when an external service promises to perform the unilateral contract according to the order of messages specified in the unilateral contract or when the external service performs the unilateral contract according to the order of messages specified in the unilateral contract, and wherein acceptance of the unilateral contract creates an instance of communication between services;

receiving a customizable tag-based document that holds a state of the service representing the device and the input/output event that has been generated by the service representing the device;

requesting the service to change a cursor shape, the act of requesting invoking a cursor shape service that changes the shape of the cursor, the cursor shape described by a customizable tag-based document, the customizable tag-based document including image data specifying pixels that comprise the cursor shape;

requesting the service to change a position of a cursor, the act of requesting invoking a cursor position service that changes the position of the cursor; and requesting the service to remove the input/output event.

19. The computer-readable recording medium of claim 18, further comprising requesting the service for creating a window, the act of creating a window creating a window service with a port identifiable by an identifier that includes a uniform resource identifier and a unilateral contract for describing one or more behaviors of the window service.

20. The computer-readable recording medium of claim 19, further comprising requesting the service for refreshing the window, the act of requesting invoking a window update service that repaints the window.

21. In a networked system, a device that is a computer subsystem, the device comprising:

one or more services executing in the device, each service including a port identifiable by an identifier that includes a uniform resource identifier and a unilateral contract for describing one or more behaviors of the service, wherein the port associated with the service comprises behavioral types, and wherein the device communicates with another device of the networked system based on compatibility of behavioral types, the device being capable of coupling to the networked system to exchange customizable tag-based messages, and wherein the one or more services comprise:

an information service, the information service being configured to produce a customizable tag-based message that hold a summary of device properties that a device service represents, the information service being further configured to store the customizable tag-based message until requested by the application service; and a data service, the data service being configured to produce the customizable tag-based message that holds events which have been generated by the one or more services but not yet consumed by an application service, the data service being further configured to store the customizable tag-based message until requested by the application service, and further wherein the customizable tag-based message holds the state of the one or more services.

* * * * *